June 20, 1944. H. B. LEARY, JR 2,352,109
FLUID TRANSMISSION DEVICE
Filed April 26, 1940 3 Sheets-Sheet 1
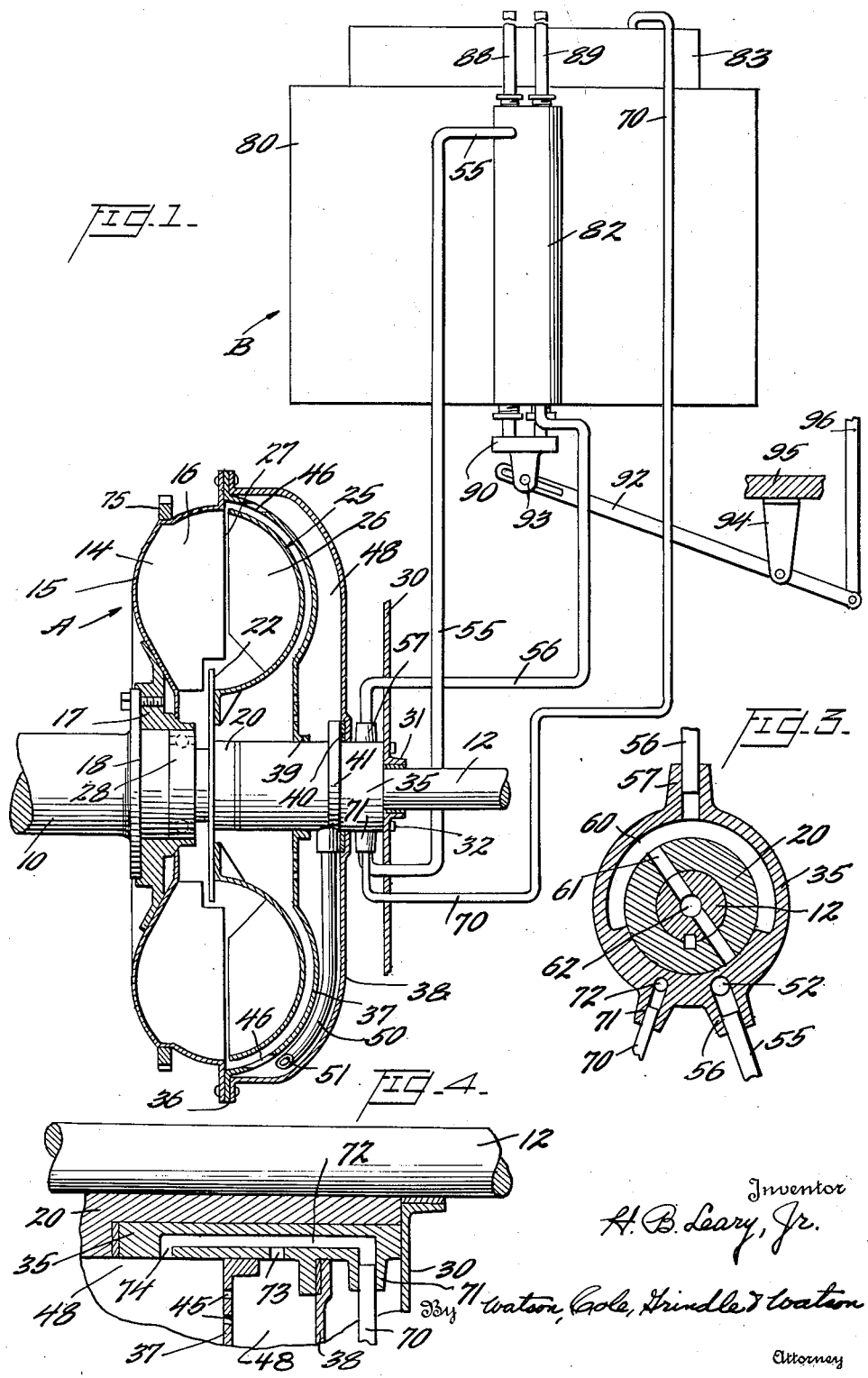

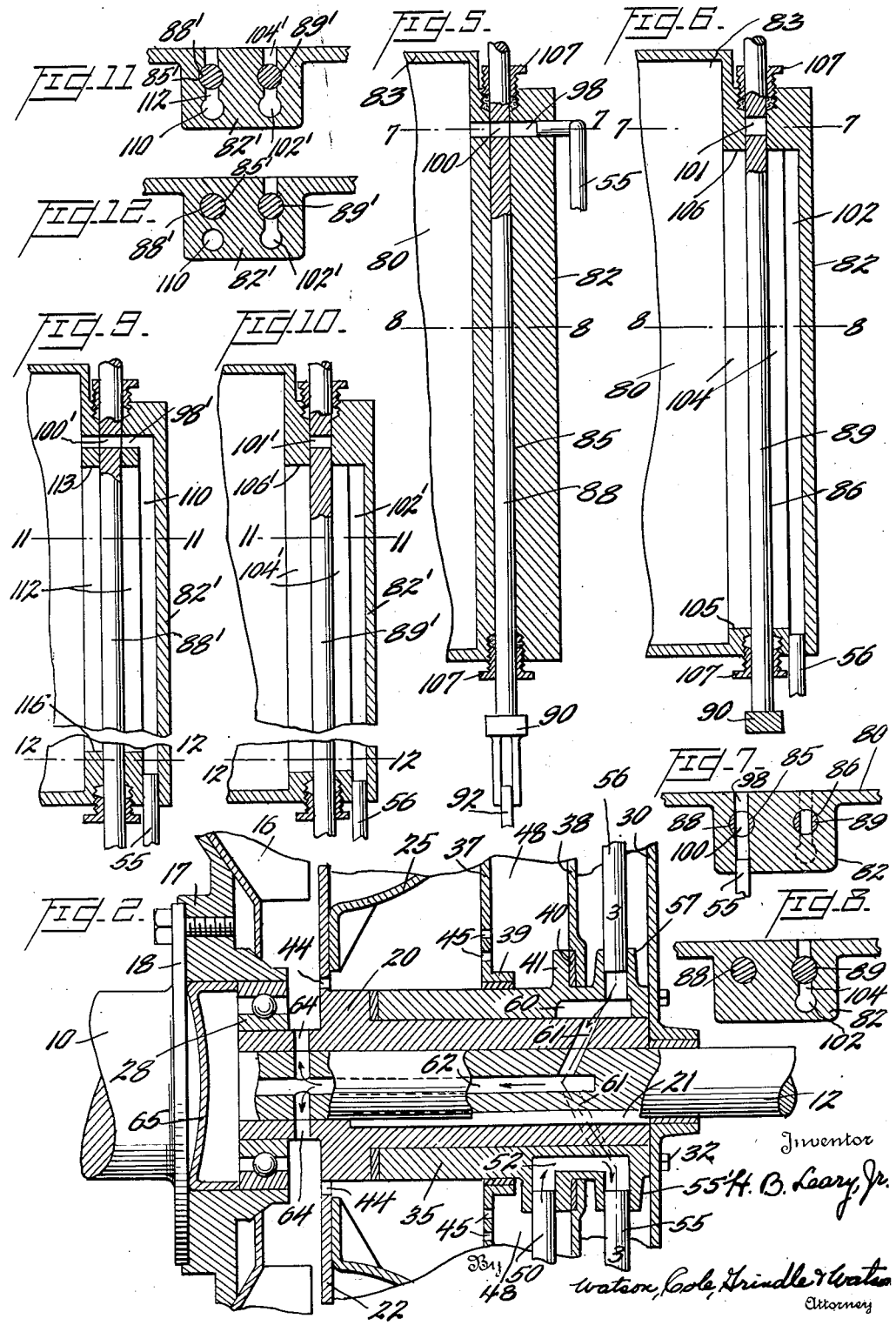

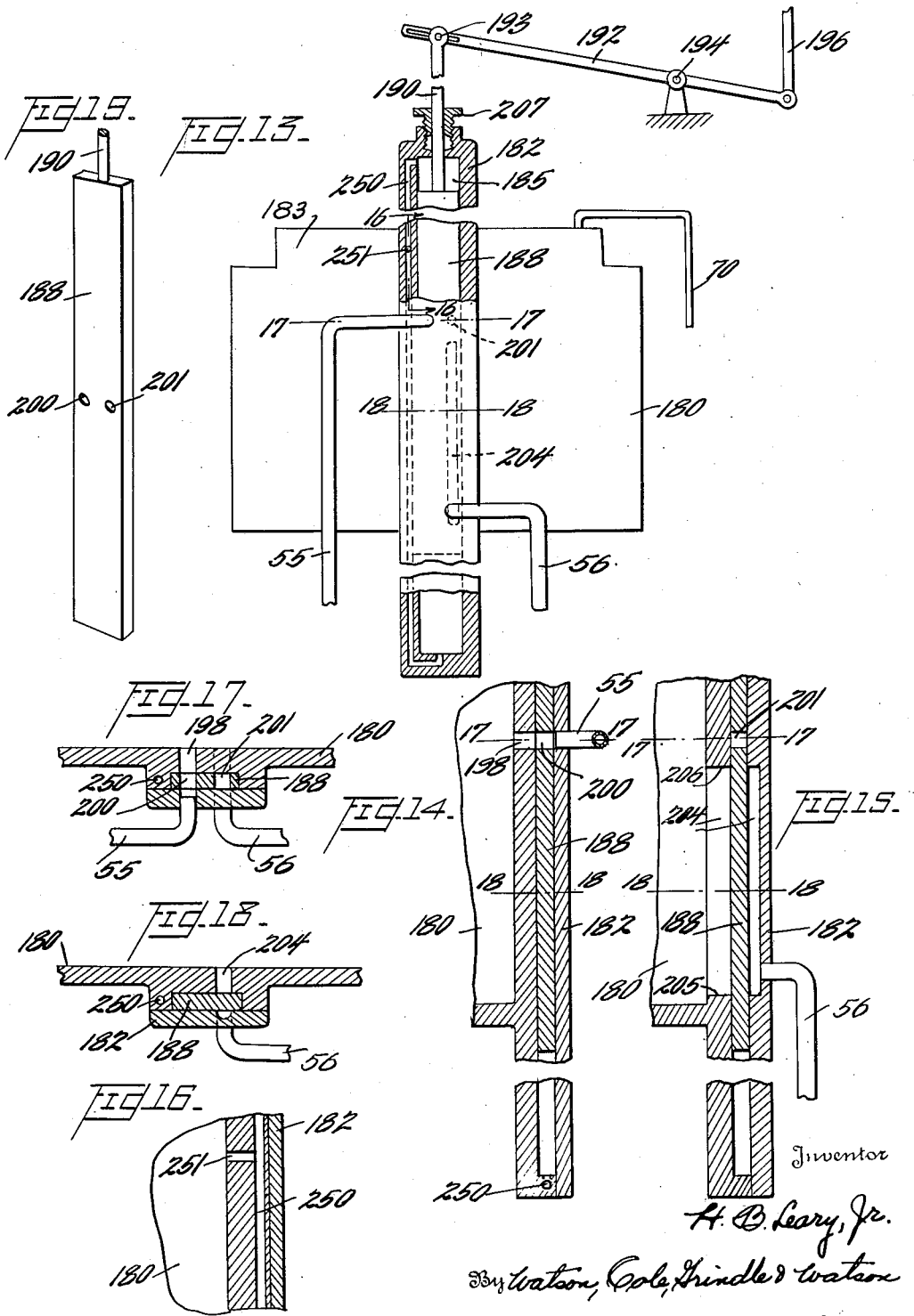

Patented June 20, 1944

2,352,109

UNITED STATES PATENT OFFICE 2,352,109

FLUID TRANSMISSION DEVICE

Harry Burton Leary, Jr., Chevy Chase, Md.

Application April 26, 1940, Serial No. 331,881

8 Claims. (Cl. 60—54)

This invention relates to power transmitting systems particularly of the hydraulic gearing type and more especially to means for controlling the gear ratio in such systems by varying the quantity of fluid in the rotor chambers thereof.

The general object of the invention is to provide novel and improved methods and apparatus for withdrawing and replenishing the supply of motive fluid in the working portion of the system in order to vary the slip between the driving and driven elements and thus attain the desired speed ratio. The invention is particularly adapted for use in the transmission of power generated by an internal combustion engine.

In some of the devices heretofore proposed for accomplishing similar purposes, there has been provided a fixed or invariable fluid supply within a chamber closely surrounding the driving and driven elements, but these arrangements require the use of supplemental change speed gears and furthermore cannot be filled to the limits of their capacities due to the necessity of allowing for thermal expansion and for other exigencies.

Other prior devices have provided for an auxiliary fluid supply chamber or sump and have varied the working supply of fluid by controlling the rate of flow through the conduit which leads from the supply chamber to the change speed elements. This type of construction provides a circulatory system in which the fluid medium, or rather a predetermined quantity thereof, is continually forced from the mechanism to the auxiliary chamber and an equal quantity allowed to return to the mechanism, the proportion of fluid being circulated—or in other words, the resistance to circulation—determining the relative speeds of the driving and driven elements.

A further disadvantage which is especially associated with the use of circulatory systems, is found in the inability of accurately measuring or determining the amount of working fluid being used at a given time due to the inclusion of air bubbles in the circulating body of liquid.

The present invention, by the provision of an ingenious centrifugal and gravity flow system, and novel controls for both the outflow and inflow conduits, attains certain of the advantages of both the fixed fluid supply and circulatory systems; and furthermore, attains a positive control of variable speeds, dispensing with any further change speed arrangement. In its preferred embodiment, the invention contemplates the provision of a variable hydraulic power transmitting unit of the modified Föttinger type, a supply tank for motive fluid disposed at a higher elevation than the hydraulic unit and provided with means for tapping the fluid from the tank at different selected levels and supplying it to the unit, and means for controlling the flow of fluid from the unit back to the tank at the same time and by the same means employed for regulating the outflow of fluid from the tank. The entire working and supply systems are air and liquid-tight and means are also provided for bypassing the air in the system to and from the tank and working unit as required by the flow of liquid. The "foaming" or inclusion of the air bubbles in the fluid in the system is minimized in the present system by the provisions for completely emptying the working portion of the system or completely filling the system as the occasion demands; the latter condition being attained to the exclusion of all of the air, due allowance being also made for expansion of the working fluid.

Other objects and features of novelty will be apparent from the following specification when read in connection with the accompanying drawings in which certain embodiments of the invention are illustrated by way of example.

In the drawings:

Figure 1 is a somewhat diagrammatic view partly in elevation and partly in vertical section, of a hydraulic power transmission system embodying the principles of the invention;

Figure 2 is an enlarged vertical sectional detail view of the axial portions of the unit;

Figure 3 is a transverse vertical sectional view taken substantially on line 3—3 of Figure 2.

Figure 4 is a fragmentary radial section of the structure shown in Figure 3;

Figures 5 and 6 are vertical sectional views taken through the inlet and outlet portions respectively of the tank valve structure in one embodiment of the invention;

Figures 7 and 8 are horizontal transverse sectional views through this valve structure taken substantially on lines 7—7 and 8—8, respectively, of Figures 5 and 6;

Figures 9 and 10 are views similar to Figures 5 and 6 but showing a modified arrangement.

Figures 11 and 12 are views in horizontal section through the tank valve casing, taken on lines 11—11 and 12—12 of Figures 9 and 10;

Figure 13 is a view in elevation of a supply tank comprising a further embodiment of the invention, portions of the multiple valve structure being broken away for the sake of clearness of illustration;

Figures 14 and 15 are fragmentary vertical sectional views through the tank inlet and outlet portions of the valve, respectively;

Figure 16 is a similar view through the balancing air and leakage duct, as taken on line 16—16 of Figure 13;

Figures 17 and 18 are horizontal sectional views taken on lines 17—17 and 18—18, respectively, of Figures 13, 14, and 15; and Figure 19 is a view in perspective of the slide valve body employed in the embodiment illustrated in assembly in Figure 13.

For convenience in describing the invention, reference is made to the embodiments chosen for illustration in the accompanying drawings, and specific language is employed. It will nevertheless be appreciated that the invention is not limited to these precise constructions and arrangements but may be subject to various changes and modifications without departing from the scope of the invention as defined in the appended claims.

Referring now more particularly to Figure 1 of the drawings, in which one embodiment of the invention is shown, it may be pointed out that the novel transmission device comprises a closed and preferably airtight system which includes the working portion designated generally by the reference character A, and the fluid supplying and displacing portion to which the letter B has been applied. The working unit A is applied in operative position between the driving or power shaft 10 and the driven or propeller shaft 12, and comprises a hydraulic coupling arrangement which is similar in some respects to the well known Föttinger gear, but is modified as will be hereafter described to provide for varying the speed and power transmitted.

So far as certain of the broader aspects of the invention are concerned the hydraulic gear or coupling may be of practically any known or preferred type but there has been selected for purposes of illustration an arrangement in which the driving portion of the hydraulic gear or clutch unit carries with it the outer casing of the working fluid chamber and encloses the driven element. In this particular illustrated embodiment all of the fluid is withdrawn from the periphery of the rotating working chamber by means of a scoop tube. As already indicated, the invention broadly contemplates the use of equivalent arrangements such as those in which both the driving and driven elements are enclosed in a stationary casing and in which the working fluid may be taken off from the periphery of the casing in any practical way.

In the working unit A the propelling or driving element of the hydraulic coupling is designated 14 and comprises an annular shell 15 containing a plurality of spaced radial plates or vanes 16, and is secured by means of the annular hub casting 17 to the flange 18 formed on the driving shaft 10. The driven shaft 12, as will be more clearly seen in Figure 2 of the drawings, is provided with an elongated tubular hub or bushing 20 which is fixed thereto by means of the key or spline 21. The hub 20 is provided with an annular flange 22 to which the driven element of the hydraulic coupling 25 is secured. This driven element 25 is substantially the counterpart of the driving element 15 and is similarly provided with vanes 26, and is adapted to rotate in a position closely adjacent to the element 15, a narrow clearance space 27 being interposed between them.

Suitable bearing arrangements are of course provided for the driving and driven shafts and relative rotative contact between these shafts is permitted by the roller bearing assembly 28 which is disposed between extensions of the hub 20 and of the hub member 17. The whole coupling may be enclosed in a transmission housing carried by the vehicle or by the stationary installation in which the transmission is employed, one wall of this housing being indicated at 30 and being provided with a bearing arrangement 31 around the driven shaft 12. Secured to this casing as by means of the bolts 32 is a stationary hub 35 through which the working fluid is introduced to the coupling.

Secured to the outer periphery of the driving element 15 so as to provide a fluid-tight joint as at 36 are the annular casing members 37 and 38. The casing 37 adjacent its central portion is provided with a flange 39 which is centered upon and rotates about the hub 35. The inward portion of the casing 38 is provided with a packed bearing arrangement 40 in conjunction with the flange 41 formed on the hub 35. The flange 22 of the driven shaft bushing 20 is provided with a series of openings 44 and the casing member 37 is provided with a plurality of similar openings 45 for insuring continual intercommunication between the several divisions of the working fluid chamber during all conditions of operation. Another annular series of openings 46 is provided adjacent the outer periphery of the casing member 37 to insure that the working fluid may pass freely from the inner chamber in which the vanes 16 and 26 operate, and the scoop chamber 48 between the casing members 37 and 38.

In this latter chamber a scoop tube 50 is disposed, the mouth 51 of which opens in a direction opposite to the direction of rotation of the driving element of the couping. The inner end of the scoop tube 50 connects with the duct 52 in the hub 35, which duct leads outwardly and is placed in communication with the pipe or conduit 55 connected to the nipple 55' of the hub. This pipe 55 leads to a tank or container included in the fluid supply portion B of the arrangement and provides means for emptying working fluid from the working portion A of the system or at least reducing the quantity of fluid therein. The novel means for controlling the flow of fluid through this conduit 55 will be presently described.

Working fluid is returned from the supply portion of the system to the coupling unit A through the conduit 56 which communicates through the nipple 57 with a partly annular pocket or chamber 60 formed in the inner surface of the hub 35 and facing the peripheral surface of the bushing 20 which rotates with the driven shaft 12. As clearly seen in Figure 3 of the drawings, the chamber is at all times in communication with one of the radial bores 61 which pass through both the bushing 20 and the driven shaft 12. These bores lead to an axial duct 62 which passes along the shaft 12 to a point adjacent its forward end where other radial bores or ducts 64 lead to the inner working chamber between the driving element 15 and the driven element 25. The duct 62 may also be continued through the end of the shaft 12 and provide a circulation of lubricant for the ball bearing assembly 28, the working fluid being preferably a mineral oil. An expansible packing ring or cup 65 may be provided to make the system fluid-tight at this point.

Obviously during the transfer of motive fluid which is in liquid form, there will be a displacement of air in the system in alternate directions between the working portion A and the supply portion B thereof, depending upon whether the working chamber is being filled or emptied. In order to provide means for transferring the displaced air from one portion of the system to the other the conduit 70 is provided, which is connected at one end to the top of the tank forming a part of the supply system and at the other end it is received within a nipple 71 which communicates with the longitudinal duct 72 provided in the hub 35 at a point spaced circumferentially from both the fluid duct 52 and chamber 60. Openings 73 and 74 lead respectively from the duct 72 into the scoop chamber 48 and the intermediate chamber of the coupling.

During operation of the driving shaft 10 the liquid within the working portion A of the system will be thrown by centrifugal force toward the outer peripheral portions of the working chambers enclosed within the gear or coupling unit and if this portion of the system is not entirely full of working liquid the axial or radially inward portions of the chambers will contain air. If liquid is then permitted to be further withdrawn by means of the scoop 50, the whirling annular body of liquid will be reduced in volume, and air will enter the central portion of the chamber through the conduit 70 and the appropriate ducts in the hub 35. On the contrary, when more liquid is being introduced into the working unit through the pipe 56, the inlet chamber 60, and the various associated ducts, this incoming liquid will be thrown at once toward the outer periphery of the chambers and the volume of air will be diminished, the air being forced through the conduit 70 back to the supply tank.

The driving member 15 in many cases may serve the purpose of a flywheel and may be provided with an annular gear 75 to which suitable starting mechanism may be connected.

The fluid controlling and supply portion of the system, which has been generally referred to by the designation B, will now be described. This portion consists essentially of the container or tank 80 which may conveniently be of cast metal and provided with a unitary multiple control valve casing or housing 82. The capacity of the tank 80 should be considerably greater than that of the working portion A of the system so as to contain a somewhat greater quantity of fluid than will ever be required to completely fill the working chamber and also a large quantity of air above the level of the liquid in the tank so that the air contained in the closed system will never be placed under great enough compression per unit of area to cause leakage. For this purpose an upward extension or dome 83 may be provided on the tank into the top of which one end of the air pipe 70 is adapted to be connected.

By reference to Figures 5-8, inclusive, of the drawings, the construction of the valve mechanism and the control of the flow of working liquid will be readily understood. Two parallel vertical bores 85 and 86 are drilled longitudinally of the valve casing 82 and vertically reciprocable slide valve members 88 and 89 are adapted to fit snugly within these bores. These slide valves are rigidly connected together for simultaneous movement by means of the yoke 90 and, as suggested in Figure 1 of the drawings, this yoke may be moved vertically by means of the lever 92 through a pin and slot connection 93. The lever may be fulcrumed upon a bracket 94 supported upon any suitable stationary part of the installation, as indicated at 95, and operably by mechanism suggested by the link 96 from any point convenient to the operator. If the arrangement is applied to an automotive vehicle, the point of operation may well be on the instrument panel or the steering post, and any other suitable motion transmitting devices may serve to operatively connect the manual actuator with the multiple valve in the casing 82.

The conduit 55 which serves to pass the motive liquid from the unit A to the tank 80 is connected with the transverse opening or passageway 98 which intersects the valve bore 85 and opens through the wall of the tank 80. In the position of the valve members shown in Figures 5 and 6, the opening 100 of the valve 88 registers with the passageway 98 and the tank is open for the reception of liquid from the unit A, and will continue to receive liquid therefrom so long as the driving shaft 10 is rotating, until the working portion A of the system is empty, whereupon no driving force will be transmitted from shaft 10 to shaft 12 since there will be complete slippage between the driving and driven elements of the hydraulic coupling. While the valve member 88 is in this position, the corresponding member 89 controlling the flow of liquid from the tank 80 to the working portion of the system will be in the position shown in Figure 6, wherein the valve opening 101 is disposed between solid imperforate portions of the wall of the tank and of the valve casing 82. In the casing 82 upon this outlet side thereof, a duct or channel 102 is disposed in parallel relation with the valve chamber or bore 86 and communicates at its lower end with the conduit 56. The wall of the tank 80 and the interior of the valve casing 82 is provided with an elongated vertical slot 104 which intersects the valve chamber 86 and connects the channel 102 with the interior of the tank 80 from the point 105 near the bottom of the tank to the point 106 which is just below the level of the inlet passageway 98.

When the valve members 88 and 89 are moved downwardly the flow of fluid from the working unit is cut off by the displacement of the valve passage 100 below registry with the duct 98, but the opening 101 in the outlet valve 89 almost immediately begins to register with the portionse of the slot 104 and provides communication between the tank 80 and the duct or channel 102 at the highest level. By a gradual lowering of the valve members the opening 101 may be progressively lowered and this will permit the liquid in the tank 80 to return through the pipe 56 to the working unit A and begin to fill the unit and gradually establish a driving connection between the two portions of the coupling, the more liquid provided in the coupling by the lowering of the tank valves, the less slippage between the elements of the coupling and the greater the power transmitted. When the opening 101 of the valve 89 reaches the point 105 the tank will have delivered enough liquid to the working unit A to fill it completely and also fill the pipe 56.

It will be noted that during the entire movement of the valve elements downwardly from the initial point in which the opening 100 registers with the passageway 98 the inlet of fluid through the pipe 55 from the working unit A to the tank 80 is cut off, this providing a fixed supply of working fluid in the unit A, the quantity of which is predetermined by means of the adjustment of the tank outlet valve 89. The slide valves 88 and 89 may be packed by suitable stuffing boxes 107 in order to prevent any possible leakage of air or working fluid.

The operation of this embodiment of the invention will now be described. With the valve in the position shown in Figures 5 and 6 of the drawings, the centrifugal effect of the rotation of the driving element of the coupling will force the working fluid through the scoop tube, the pipe 55, and the registering ports 98, 100 in the tank inlet valve structure, until the coupling chamber is empty; no fluid being allowed to flow through the outlet valve portion from the tank to the working part of the system. The coupling is thus disconnected and no power will be supplied to the driven shaft. Upon progressive lowering of the multiple valve member, the return conduit 55 will be cut off and the overflow of working fluid from the tank to the coupling will be allowed to increase, whereupon the slippage between the elements of the coupling will gradually decrease and the speed of the driven shaft will proportionately increase. Throughout all of these speed changes, however, there will be no return flow to the tank, and especially during the highest speed adjustment the coupling chamber will be completely filled with liquid to the exclusion of all of the air in the system, the air having been driven out of the coupling through the by-pass conduit 70. To resume the declutched or certain of the low speed adjustments, the valve member is returned quickly to its uppermost position for emptying the coupling, and then it can be lowered to attain the speed ratio appropriate to the resistance encountered by the driven shaft.

In Figures 9–12, inclusive, of the drawings there is illustrated a modified form of multiple control valve for governing the flow of fluid to and from the working unit A, and this arrangement comprises the valve casing 82' in which the valve members 88' and 89' are adapted to reciprocate, the opening 100' in the valve 88' registering with the openings 98' in the uppermost position, and the valve passageway 101' of the valve 89' being cut off from communication with the tank 80, all as in accordance with the initial position described in connection with the embodiment illustrated in Figures 5–8 of the drawings. In this case the duct 98', instead of directly communicating with the pipe 55, is placed in communication with a channel or passageway 110 which is disposed parallel with the outlet channel 102'. A transverse slot 112 intersects the valve chamber 85' and communicates with the channel 110 between the points 113 and 115. Upon downward movement of the valve members in this embodiment the openings 100' and 101' both provide communication with the tank and the respective conduits 55 and 56 when they pass the points 113 and 106', and thus during subsequent intermediate speeds the liquid which is allowed to flow from the tank 80 to the working unit A continually circulates from the unit to the tank and back again. However, when the range of highest speeds is attained and the valve opening 100' in the valve 88' passes the point 115, the return conduit 55 will be cut off and the unit A will be filled with a fixed body of working fluid and no circulation of fluid will occur. If a reduction in speed ratio is then required the multiple valve 88', 89' will be raised until the port 100' is above the point 115 and the return conduit 55 will again be permitted to discharge liquid into the tank, and then various intermediate speeds can at once be attained without returning all of the way to the zero position.

A further modification of the invention is illustrated in Figures 13–18 of the drawings and provides a somewhat more compact multiple valve arrangement in which the possibility of leakage is entirely precluded. The tank 180 in this case is provided with a preferably integrally formed valve casing 182 which is provided with a valve chamber 185 in which a valve member 188, of substantially rectangular cross-section, is disposed for vertical reciprocation. A stem 190 is secured to the valve body 188 and passes outwardly from the casing 182 through the stuffing box 207. A lever 192 fulcrumed as at 194 is operatively connected with the stem 190 as by means of the pin and slot connection 193. A link 196 may serve to actuate the lever and is controlled as in the other cases by a manual actuator convenient to the person operating the transmission. The casing 182 is entirely closed at the bottom and in order to permit the escape or by-passing of any entrapped leakage fluid or air from the chamber 185 either above or below the reciprocating valve 188 the air duct 250 is provided, this duct being placed in communication with the air dome 183 of the tank by means of the opening 251, as clearly shown in Figures 13 and 16 of the drawings.

The valve body 188, of course, takes the place of the double valve 88, 89 of the first described embodiment, and is provided with openings 200 and 201 which correspond respectively with the inlet and outlet openings 100 and 101 of the other embodiment respectively. The opening 200 provides communication through the inlet passageway 198 of the tank, and the opening 201, after it has passed downwardly beyond the point 206 (Figure 15) provides communication across the slot 204 and outwardly through the pipe 56. During the descent of the valve 188 the opening 201 provides overflow means at successive levels in the tank down to the point 205 where the working system A will be full of liquid. During the descent of the valve 188, the return flow through the conduit 55 will be cut off, but the coupling may be disconnected and the lower speeds resumed by returning the valve 188 to the position in Figures 14 and 15. Obviously, by providing the valve casing 182 upon the return side with a slot similar to that shown at 112 in the embodiment illustrated in Figure 9, the same results may be attained as are afforded by that modification.

Having thus described the invention, what is claimed as new and desired to be secured by Letters Patent is:

1. A variable speed hydraulic coupling system comprising, in combination, a driving member and a member adapted to be driven therefrom at variable speeds, a circular working chamber adapted to contain variable quantities of working fluid and air, a vaned impeller element operatively connected with said driving member and having parts adapted to rotate within the fluid in said chamber, a cooperating vaned driven element disposed within the chamber and operatively connected with said driven member, a gravity supply chamber disposed at a higher elevation than said working chamber and of at least the same capacity as said working chamber, a conduit for conducting working fluid from said working chamber to said supply chamber, a conduit for conducting working fluid from said supply chamber to said working chamber, said chambers and conduits comprising a closed substantially air-tight system, means for permitting fluid to flow through said second named conduit from different levels of said gravity tank and for simultaneously cutting off the flow of fluid through said first-named conduit, whereby a definite predetermined amount of working fluid is disposed in said working chamber, and an air conduit connecting said two chambers.

2. A variable speed hydraulic coupling system comprising, in combination, a circular chamber and impeller and driven elements associated therewith and comprising the working portion of said system, a gravity tank disposed at a higher level than said chamber for receiving fluid from and supplying it to said working portion of the system, a conduit connecting the peripheral portions of said chamber with said tank for conducting fluid from said chamber to said tank, a conduit connecting the axial portion of said chamber with said tank for conducting fluid from said tank to said chamber, a multiple valve casing on the wall of said tank, openings through said wall into said valve casing, ducts leading through said valve casing to said respective conduits, a multiple valve member slidable in said casing and provided with openings adapted to selectively register with said first named openings and said ducts upon the actuation of said valve, certain of said openings in the slidable valve body controlling the flow of fluid into said tank from said first named conduit and another controlling the flow from said tank to said second named conduit, and manually operable means for actuating said valve.

3. A variable speed hydraulic coupling system comprising, in combination, a circular chamber and impeller and driven elements associated therewith and comprising the working portion of said system, a gravity tank disposed at a higher level than said chamber for receiving fluid from and supplying it to said working portion of the system, a conduit connecting the peripheral portions of said chamber with said tank for conducting fluid from said chamber to said tank, a conduit connecting the axial portion of said chamber with said tank for conducting fluid from said tank to said chamber, a multiple valve casing on the wall of said tank, a unitary slide valve member adjustable in said casing, an opening through said wall into a portion of said casing, a duct connecting said portion of the casing with said first named conduit, an opening through said valve member adapted to register with and connect said first named opening and said duct at one position of said valve, a vertical slot in said wall affording communication between the tank and another portion of the interior of said casing throughout the greater part of the height thereof, a duct adapted to connect said slot with said second named conduit, a second opening through said slide valve member adapted to place selected portions of said slot in communication with said last named duct at graduated heights to control the amount of fluid supplied from said tank to the working portion of said system by the force of gravity.

4. A variable speed hydraulic coupling system comprising, in combination, a circular chamber and impeller and driven elements associated therewith and comprising the working portion of said system, a gravity tank disposed at a higher level than said chamber for receiving fluid from and supplying it to said working portion of the system, a conduit connecting the peripheral portions of said chamber with said tank for conducting fluid from said chamber to said tank, a conduit connecting the axial portion of said chamber with said tank for conducting fluid from said tank to said chamber, a multiple valve controlling the flow of fluid between said conduits and the tank, means for moving said valve to any of a plurality of positions, said valve being so constructed and arranged that at one of its extreme positions said first named conduit is opened for flow of fluid from the coupling to the tank and said second named conduit is cut off in order to prevent flow from the tank to the coupling, and in all other positions of said valve, including the opposite extreme position, the first named conduit is closed to cut off flow of fluid from the tank and the second named conduit is opened to deliver a measured quantity only of fluid from said tank to said coupling, said quantity being directly proportional to the degree of movement from said valve from first named extreme position whereby a fixed non-circulatory body of fluid of selectively variable quantities may be supplied for operating the coupling.

5. A variable speed hydraulic coupling system comprising, in combination, a circular chamber and impeller and driven elements associated therewith and comprising the working portion of said system, a gravity tank disposed at a higher level than said chamber for receiving fluid from and supplying it to said working portion of the system, a conduit connecting the peripheral portions of said chamber with said tank for conducting fluid from said chamber to said tank, a conduit connecting the axial portion of said chamber with said tank for conducting fluid from said tank to said chamber, a multiple valve controlling the flow of fluid between said conduits and the tank, means for moving said valve to any of a plurality of positions, said valve being so constructed and arranged that in one of its extreme positions, said first named conduit is opened to permit flow from the coupling to the tank and said second named conduit is closed to flow of fluid from the tank to the coupling, that at all of a plurality of intermediate positions of said valve both conduits are open, thus permitting flow of fluid from various levels of the tank to the coupling and a circulatory flow of the quantity of fluid determined by the degree of movement of the valve from its said extreme position, while at the opposite extreme position of the valve the flow from the coupling to the tank through said first mentioned conduit is cut off, resulting in a fixed non-circulatory body of fluid of substantially the full capacity of the coupling being trapped in the coupling.

6. A variable speed hydraulic coupling system comprising, in combination, a circular chamber and impeller and driven elements associated therewith and comprising the working portion of said system, a gravity tank disposed at a higher level than said chamber for receiving working fluid from and supplying it to said working portion of the system, a conduit connecting the peripheral portions of said chamber with said tank for conducting fluid from said chamber to said tank, a conduit connecting the axial portion of said chamber with said tank for conducting fluid from said tank to said chamber, a unitary multiple valve body having a valve member for controlling the flow of fluid between each of said conduits and the tank, means for moving said valve to any of a plurality of positions, including the position where said first named conduit is cut off, and at least one position wherein the first named conduit is cut off and said second named conduit is open to the tank at selected levels of fluid in the latter.

7. A variable speed hydraulic coupling system comprising, in combination, a circular chamber and impeller and driven elements associated therewith and comprising the working portion of said system, a gravity tank disposed at a higher level than said chamber for receiving fluid from and supplying it to said working portion of the system, a conduit connecting the peripheral portions of said chamber with said tank for conducting fluid from said chamber to said tank, a conduit connecting the axial portion of said chamber with said tank for conducting fluid from said tank to said chamber, a multiple valve body having a unitary sliding valve member for controlling the flow of fluid between each of said conduits and the tank, means for moving said valve member to any of a plurality of positions, including the position where said first named conduit is in communication with the tank and said second named conduit is cut off, and at least one position wherein the first named conduit is cut off and said second named conduit is open to the tank at selected levels of fluid in the latter, said valve member fitting closely within the side walls of said casing with the casing enclosing said member at both of its ends beyond its limits of travel within the casing, ducts connecting the ends of said casing with the top of said tank, and with each other, whereby air and any possible leakage of liquid may be retained in the system, either by being by-passed from one end of the valve casing to the other or conducted to the upper portion of said tank.

8. A variable speed hydraulic coupling system comprising, in combination, a circular chamber and impeller and driven elements associated therewith and comprising the working portion of said system, a gravity tank disposed at a higher level than said chamber for receiving fluid from and supplying it to said working portion of the system, a conduit connecting the peripheral portions of said chamber with said tank for conducting fluid from said chamber to said tank, a conduit connecting the axial portion of said chamber with said tank for conducting fluid from said tank to said chamber, a multiple valve casing on the wall of said tank, a unitary slide valve member adjustable in said casing, an opening through said wall into a portion of said casing, a duct connecting said portion of the casing with said first named conduit, an opening through said valve member adapted to register with and connect said first named opening and said duct at one position of said valve, a vertical slot in said wall affording communication between the tank and another portion of the interior of said casing throughout the greater part of the height thereof, a duct adapted to connect said slot with said second named conduit, a second opening through said slide valve member adapted to place selected portions of said slot in communication with said last named duct at graduated heights to control the amount of fluid supplied from said tank to the working portion of said system by the force of gravity, a second vertical slot in said wall affording communication between the tank and said portion of the casing which is connected with said first named conduit, said second named slot terminating short of the bottom of said tank, whereby communication is afforded between the tank and said first named conduit during intermediate positions of the valve but is cut off at one of its terminal positions.

HARRY BURTON LEARY, Jr.